United States Patent
Song

(10) Patent No.: US 6,240,299 B1
(45) Date of Patent: May 29, 2001

(54) CELLULAR RADIOTELEPHONE HAVING ANSWERING MACHINE/VOICE MEMO CAPABILITY WITH PARAMETER-BASED SPEECH COMPRESSION AND DECOMPRESSION

(75) Inventor: Wei-jei Song, Aliso Viejo, CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/026,619

(22) Filed: Feb. 20, 1998

(51) Int. Cl.$^7$ ..................................... H04Q 7/20
(52) U.S. Cl. .................. 455/550; 704/219; 704/265; 455/413
(58) Field of Search ................... 455/412, 413, 455/456, 422; 704/201, 219, 224, 225, 265, 216; 379/68, 83, 85

(56) References Cited

U.S. PATENT DOCUMENTS

| | | | |
|---|---|---|---|
| 4,092,493 | * 5/1978 | Rabiner et al. | 179/1 SB |
| 4,270,026 | * 5/1981 | Shenoi et al. | 179/15.55 R |
| 4,937,868 | * 6/1990 | Taguchi | 381/38 |
| 4,975,955 | * 12/1990 | Taguchi | 381/36 |
| 5,054,073 | * 10/1991 | Yazu | 381/37 |
| 5,768,613 | * 6/1998 | Asghar | 395/800.35 |
| 5,778,314 | * 7/1998 | Sudo et al. | 455/412 |
| 5,821,874 | * 10/1998 | Parvulescu et al. | 455/413 |
| 5,826,187 | * 10/1998 | Core et al. | 455/412 |
| 5,867,793 | * 2/1999 | Davis | 455/556 |
| 5,884,010 | * 3/1999 | Chen et al. | 395/2.37 |
| 6,047,254 | * 4/2000 | Ireton et al. | 704/209 |

\* cited by examiner

Primary Examiner—Edward F. Urban
Assistant Examiner—Tilahun Gesesse
(74) Attorney, Agent, or Firm—Price and Gess

(57) ABSTRACT

A method for speech encoding and decoding usable in a Digital Telephone Answering Machine/Voice Memo for a cellular radiotelephone is provided. The apparatus uses parameter-based speech compression and decompression modules. These modules perform decimation of standard-type speech parameter frames before storing the message, and interpolation before playing the message, in order to substantially reduce the number of parameter bits in parameter frames of the stored speech signal. The result is a decreased demand for storage space and increased speed of speech compression and decompression.

15 Claims, 2 Drawing Sheets

CELLULAR RADIOTELEPHONE HAVING ANSWERING MACHINE/VOICE MEMO CAPABILITY WITH PARAMETER-BASED SPEECH COMPRESSION AND DECOMPRESSION

BACKGROUND OF THE INVENTION

1. Field of the Invention

The present invention relates to speech coding in a cellular radiotelephone having answering machine and voice memo capability. More specifically, the present invention relates to a method for parameter-based speech compression and decompression, usable in a cellular radiotelephone for an answering machine and voice memo.

2. Description of Related Art

A Digital Telephone Answering Machine (DTAM) is used for saving audio messages, sent from far away and received by way of a base station, in a memory of a digital cellular radiotelephone, when the radiotelephone is off or cannot receive signals for another reason. Conventionally, this service is provided by the cellular communication system base station, which stores messages in its computer's voice mail database. Therefore, messages are only available by calling the base station. A Voice Memo is used for local speech, by the owner of the radiotelephone, for saving his or her own messages for future use. It may also be used for recording local conversations.

Linear Predictive Coding (LPC) is used extensively in digital speech transmission, speech recognition and speech synthesis systems which must operate at lower bit rates. The efficiency of LPC arrangements results from a method used in encoding the speech information. The LPC coding modules first sample an input speech message at a predetermined rate, and then partition the speech samples into a sequence of full rate time frames 5 to 20 milliseconds in duration. The speech signal is quasi-stationary during such time intervals and may be characterized as a relatively simple vocal tract model specified by a relatively small number of parameters.

During encoding, for each time frame a set of linear parameters is generated and saved in a parameter frame. The parameters are representative of the spectral content of the speech pattern. The encoded data thus consist of parameters which correspond to the shape of the user's vocal tract and its excitation. The bandwidth of the parameter set is substantially less than the bandwidth of the speech signals. Such parameters may be later applied to a linear filter of a decoder which models the human vocal tract, along with signals representative of the vocal tract excitation, to reconstruct a replica of the speech pattern.

There are many different types of digital speech coders usable for wireless communication. Some of the coders are RPE-LTP (FR), ACELP (EFR), QCELP (CDMA), and VSELP (CDMA). Each cellular radiotelephone typically has several speech coders, which may be of different type. Analysis by Synthesis speech coders are the typical LPC coders used in cellular communication systems. All versions of the LPC speech coders share the same speech parameter frame format, which consists of an LPC frame followed by four subframes. The subframes save pitch and noise information about the speech sequence. In a 20 msec speech frame, each subframe typically contains little less than 5 ms of speech.

During encoding, a sequence of frames of a speech signal is compressed in a speech encoder, which stores parameters of the speech signal in speech parameter frames, which are parts of speech records, to ensure better coding quality during decoding. Moreover, parameters stored in the record header define the coder used during encoding, so that in systems that support multiple coders the decoding is performed with the same coder characteristics which are known and saved. For a GSM FR sequence of 260 bits, as used by a RPE-LTP coder, 50–76 coefficients are saved in the header of the speech parameter record. The choice of the coder type (such as GSM FR, EFR, and HR, or CDMA QCELP and EVCR) may also depend on the characteristics of a base station.

DTAM/Voice Memo for wireless radiotelephones differs from analog answering machines which record messages on a magnetic tape, in that, in a DTAM/Voice Memo, speech parameter frames must be stored in a memory chip. Because a typical memory chip of a cellular radiotelephone has to be small in size, the memory chip has limited storage capacity, presently up to 4 MB of RAM, and can only save short messages. Each recording sample has 2–3 seconds of recording. Because the typical bit rate is 13–16 Kbits/sec (Kbps), only a message or conversation shorter than 6 minutes could be saved in 4 MB of RAM.

The bit rate in a conventional DTAM/Voice Memo device has to be much higher than in speech coders used in regular telephones (8 to 13 Kbps). Even with a high rate of speech compression, two speech coders would have to run at the same time in a conventional DTAM/Voice Memo device, to separately implement the DTAM and Voice Memo utilities. This presents problems in terms of the limited duration of talk time which can be saved and higher cost due to the extra resources required.

It is desirable to reduce the amount of code bits saved for each speech signal frame in order to provide greater economy of storage of messages in a DTAM/Voice Memo, and, possibly, economical usage of transmission facilities.

OBJECTS AND SUMMARY OF THE INVENTION

It is a primary object of the present invention to overcome the aforementioned shortcomings associated with the prior art and to provide an efficient method and apparatus for parameter-based speech compression and decompression, usable in a DTAM/Voice Memo of a cellular radiotelephone.

Another object of the present invention is to provide good quality coding of speech frames at a reduced bit rate, by modifying the characteristics of saved speech messages.

These, as well as additional objects and advantages of the present invention, are achieved by providing a method and an apparatus for parameter-based speech compression and decompression, which can be used in a DTAM/Voice Memo of a cellular radiotelephone. The DTAM/Voice Memo apparatus and the corresponding method embodiment of the present invention perform decimation of standard-type speech parameter frames before storing the message, and interpolation before playing the message, thereby substantially reducing the number of parameter bits in parameter frames of the stored speech signal, and decreasing demand for storage space and increasing speed of speech compression and decompression.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DETAILED DESCRIPTION OF THE PREFERRED EMBODIMENTS

The following description is provided to enable any person skilled in the art to make and use the invention, and sets forth the best modes contemplated by the inventor of carrying out the invention. Various modifications, however, will remain readily apparent to those skilled in the art, since the general principles of the present invention have been defined herein specifically to provide a compression and decompression method and a DTAM/Voice Memo usable in a cellular radiotelephone to obtain high efficiency of storage.

Figure 1:
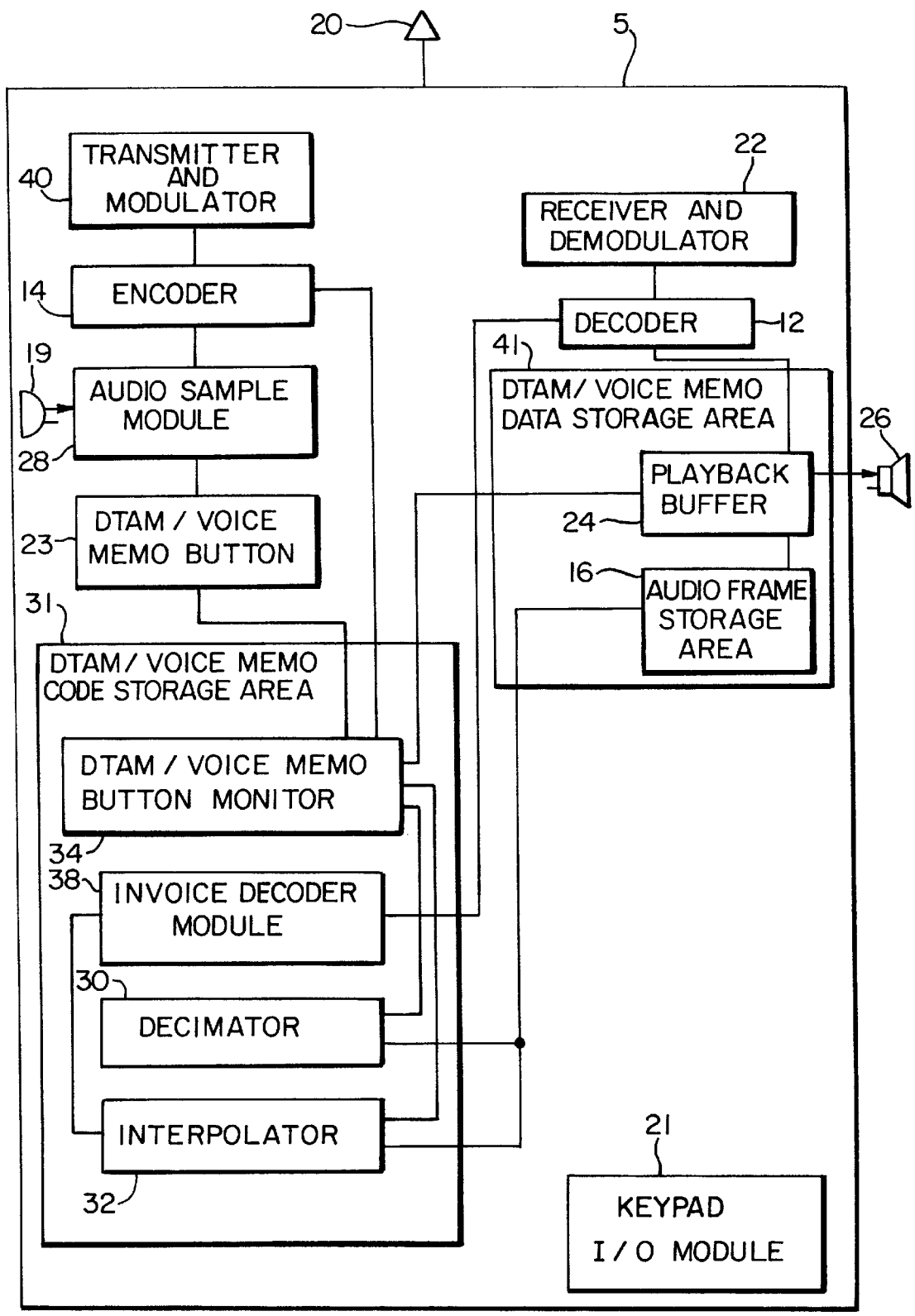
FIG. 1 is a diagramatic illustration showing the structural components of a cellular radiotelephone with a DTAM/Voice Memo, according to a preferred embodiment of the present invention.

FIG. 1 is a diagramatic illustration showing the structural components of a cellular radiotelephone 5 with a DTAM/Voice Memo, according to the preferred embodiment of the present invention. The cellular radiotelephone 5 has some conventional hardware and software elements which are shared with the DTAM/Voice Memo of the present invention, such as an antenna 20, a speech decoder 12, a receiver and demodulator module 22, a speech encoder 14, a transmitter and modulator module 40, an audio sample module 28, a keypad I/O module 21, a speaker 26, and a microphone 29. The dedicated DTAM/Voice Memo hardware includes a DTAM/Voice Memo button 23 and a dedicated DTAM/Voice Memo code storage area 31.

The code storage area 31, preferably a conventional ROM, includes dedicate software programs for a DTAM/Voice Memo button monitor 34, invoke decoder module 38, decimator 30 and interpolator 32. The dedicated DTAM/Voice Memo data storage area 41 includes a playback buffer 24 and an audio frame storage area 16, which preferably consists of at least 4 MB of RAM, such as DRAM. The DTAM/Voice Memo of the present invention operates under control of a series of software programs with instructions developed especially for the present invention. In addition, the DTAM/Voice Memo uses some conventional software for processing speech signals and for interfacing with conventional elements of the cellular radiotelephone 5.

Figure 2:
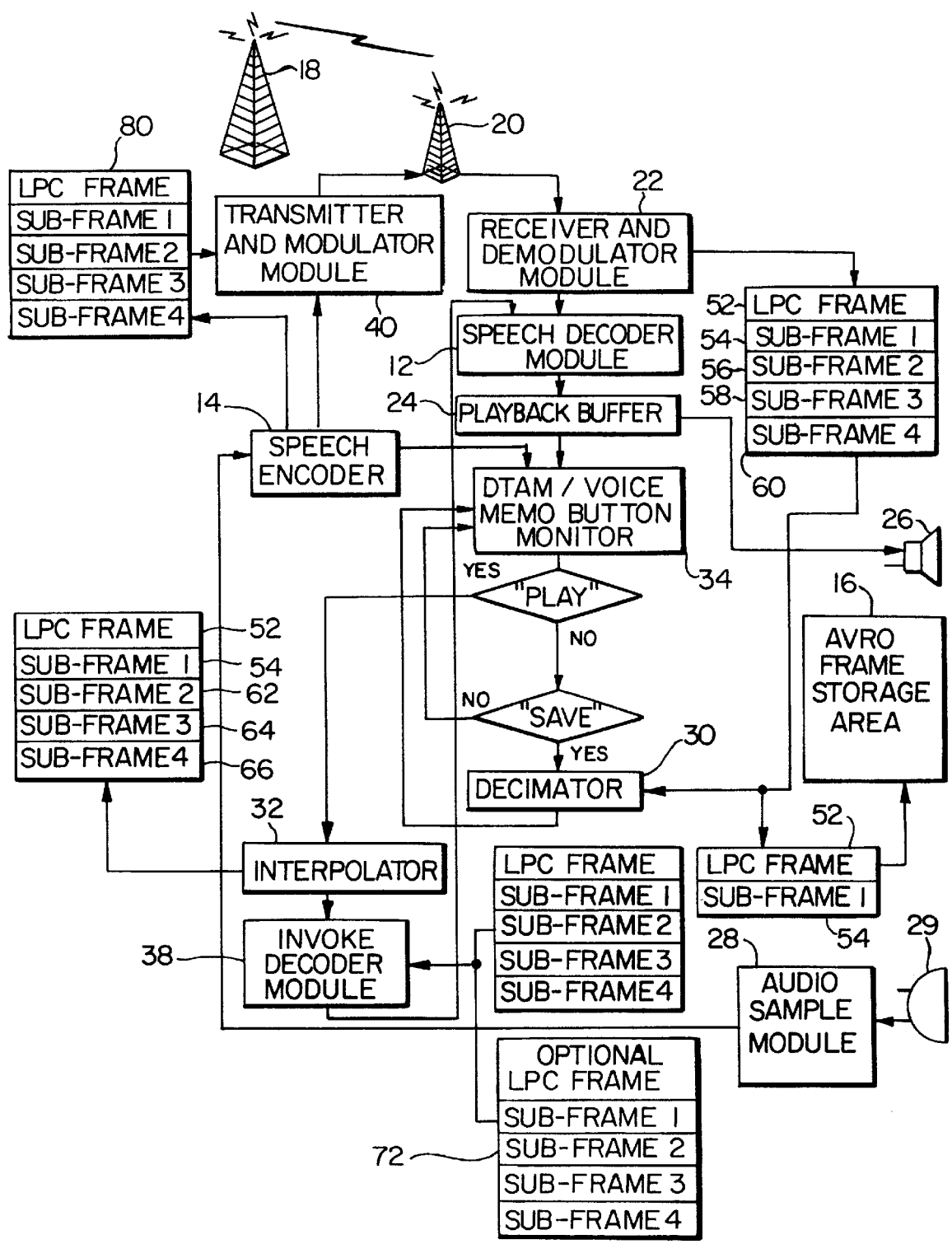
FIG. 2 is a diagramatic illustration of a flow chart illustrating the encoding and decoding operations of the DTAM/Voice Memo for a cellular radiotelephone, according to a preferred embodiment of the present invention.

FIG. 2 is a diagramatic illustration of a general flow chart illustrating encoding and decoding operations of the DTAM/Voice Memo for a cellular radiotelephone, according to the preferred embodiment of the present invention. The method of the invention is adapted to compress the signal codes of the input speech message, by modifying a speech message parameter code sequence length, in order to reduce the storage space required for the parameter code. The quality of speech saved in the DTAM/Voice Memo may be lower than for standard speech coders, which is MOS 4.5 for GSM EFR coders, and MOS 3.7 for GSM FR coders. However, because the decoding and encoding may be performed in the same coder, even though a certain number of parameters are lost by the decimation method of the present invention, the recorded messages still have sufficiently good quality.

As shown in FIG. 2, the standard speech parameter frame format, having an LPC frame 52 and four subframes 54, 56, 58 and 60, is used in the speech decoder 12. The coder parameters are preserved in the record for later use in the speech encoder 14. The speech parameter frame is decimated after decoding and only a portion of the parameter frame is saved in the dedicated audio frame storage area 16. Preferably, the present invention shortens the stored parameter frame size to just one LPC frame 52 and preferably one subframe 54, and possibly two subframes 54 and 56, instead of keeping all four subframes 54, 56, 58 and 60. Thus, longer messages can be stored in the cellular radiotelephone's relatively small dedicated audio frame storage area 16. Therefore, for example, when a GSM FR sequence is used according to the present invention, instead of storing all 76 parameters only about 40 parameters are saved for each frame.

As illustrated in FIG. 2, communication signals from a base station antenna 18, which are in channel codes, are received by the antenna 20 of the cellular radiotelephone 5. The programs used in the conventional receiver/demodulator module 22 convert received channel codes into speech parameter frames and store them in the audio frame storage area 16. In GSM systems, this process is defined by the GSM 05.01 and 05.03 protocols. In CDMA systems, this process is defined by the IS-136 protocol for QCELP. These protocols are incorporated herein by reference.

The speech may be one-way speech, which can be from far away or local, or conversational, two-way speech, which can also be from far away or local. The speech signal parameter frames are stored in records, wherein the records with frames from far away are followed by records with local speech frames. Each voice message has at least one record with standard speech parameter frames, and each standard speech parameter frame has an LPC frame and a plurality of subframes. Each record starts with a record header which stores parameters with information about previous silence time, if there is a voice gap, a play direction for conversational recording, the coder type (like GSM FR or EFR), and other information pertinent to the frames of the record. Silence in a frame (SID) is recorded during a silence period. Silence frames are 500 msec long, whereas the speech parameter frames are 20 msec long. The speech decoder programs of the conventional decoder 12 decode speech signals into linear speech samples of preferably 8 KHz. The playback buffer 24 is used to collect linear speech samples in burst mode and send the linear speech samples to the speaker 26. For example, in GSM FR systems, each burst includes 160 samples.

The software for the audio sample module 28 is used to collect local speech samples from the microphone 29, for encoding in the encoder 14 into standard speech parameter frames 80. Then, they may be decimated and saved in the Voice Memo dedicated audio frame storage area 16 for future playback. Or, if used during conversational mode of the radiotelephone, sent for airborne transmission, after conversion in the transmitter/modulator module 40. The transmitter/modulator module 40 converts standard speech signal frame 80 code words into channel codes.

If transmission is not necessary, the system re-enters the DTAM/Voice Memo control button monitor 34 program to examine the status of the DTAM/Voice Memo control button 23 and proceed accordingly. If the DTAM/Voice Memo control button 23 does not request use of the DTAM/Voice Memo in either "PLAY" or "SAVE" mode, the system waits in the DTAM/Voice Memo control button monitor 34 program. The microphone 29 and the audio sample software 28 may also be used in the training mode of the device.

The GSM-based full rate coder typically needs 20 msec per frame. GSM protocols 06.01, 06.11, 06.12, 06.31, and 06.32 provide general description of conventional full rate (FR) speech transcoding, full rate lost speech frame substitution and muting, full rate comfort noise insertion, full rate discontinuous transmission (DTX), and full rate voice activity detection (VAD) for conventional GSM FR speech coders, which may be used in the preferred embodiments of the present invention. These protocols are incorporated herein by reference.

The preferred embodiments of the present invention utilize, for the decoder 12 and encoder 14, conventional coding modules. They incorporate additional, specially prepared, software programs which include programs used in the decimator 30 and interpolator 32. However, it is conceivable that a dedicated encoder and decoder may be used for the DTAM/Voice Memo of the present invention, which would include decimator and interpolator modules. Preferable coder types for the present invention are LPC coders, such as Analysis by Synthesis speech coders.

DTAM/Voice Memo is controlled with the DTAM/Voice Memo control button monitor 34, triggered with a change in position of the DTAM/Voice Memo control button 23, which may be by default in "SAVE" mode and manually switchable to "PLAY" mode. If the status of the button requests "SAVE" mode, the decimator 30 of the present invention decimates each standard speech parameter frame with four subframes into a decimated parameter frame with preferably only one subframe, and thus converts a 260-bit speech frame with coding rate of 13 Kbps into a 92-bit speech frame with coding rate of 4.6 Kbps for GSM FR codes, or a 244-bit speech frame of 12.2 Kbps for GSM EFR codes into a 92-bit speech frame of 4.6 Kbps. The method of the present invention may be applied to other types of coders usable in wireless systems, such as GSM HR, CDMA QCELP and EVRC, or TDMA VSELP, with similar results.

The decimated frame is stored in the dedicated audio frame storage area 16. In the present invention, the DTAM/Voice Memo control button monitor 34, or a separate software program, may set an indicator, not shown, showing that a message is saved, which will inform the user when the radiotelephone is turned on. It is conceivable that a pager, not shown, may be used to more quickly alert the user that the message is stored.

When the status of the DTAM/Voice Memo control button 23 shows a request for "PLAY" mode, data from the audio frame storage area 16 is sent to the interpolator 32 of the present invention, which converts decimated frames with preferably only one subframe into the standard speech parameter frames with four subframes. Interpolation is a pre-processing step of the decoding step, and thus has to convert decimated parameter frames into standard speech parameter frames for use by a conventional decoder, preferably the same decoder 12. Therefore, in the interpolation step, the space in the subframes 62, 64 and 66 of the standard speech parameter frame is padded with zeros, some other data, or, preferably, the same saved parameter codes from the subframe 54 of the decimated frame are duplicated three times to obtain the standard speech parameter frame, consisting of one LPC frame 52 and four subframes 54, 62, 64 and 66.

After interpolation, the invoke decoder software module 38 forwards the retrieved interpolated DTAM/Voice Memo speech parameter frames to the decoder 12. In the conversational mode, the invoke decoder software module 38 may handle two records at a time, an incoming record 70 in incoming direction and an outgoing record 72 in outgoing direction. The decoder 12 decodes standard speech parameter frames into speech signals and sums linear speech samples from both directions, if recording in conversational mode, to be collected in the playback buffer 24 in burst mode and sent to the speaker 26.

The DTAM/Voice Memo of the present invention is much more efficient than the conventional devices because it saves over 50% of the audio frame storage area and increases the coding rate. Moreover, the decoding for DTAM playback may be performed when the cellular radiotelephone is not powered up, thereby not taking power during the in-use hours. Moreover, the coding program software space is saved because only very few software glue logic elements have to be used in the implementation of the method of the present invention and the DTAM/Voice Memo device.

It is conceivable that the stored messages from the cellular radiotelephone data storage area 16 may be sent to a PC or to the Internet, from a modem, and retrieved from those locations. The present invention, though applicable to any cellular communication system, is believed to be especially applicable to the GSM and CDMA cellular radiotelephones for digital cellular networks.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein and be implemented in any similar device, which transmits information from a cellular device from base stations, such as pagers.

What is claimed is:

1. A radiotelephone comprising:
    a demodulator module for converting voice messages received from a base station into standard speech parameter frames, each standard speech parameter frame having an LPC frame and a plurality of subframes;
    a decimator for decimating the standard speech parameter frames into decimated frames,
    each decimated frame having the respective LPC frame and one subframe;
    an audio frame storage area for storing the decimated frames of the voice messages; and
    an interpolator for converting the decimated frames, stored in the audio frame storage area, into the standard speech parameter frames.

2. The radiotelephone of claim 1 wherein the interpolator and decimator comprise computer programs stored in a code storage area.

3. A radiotelephone, comprising:
    a demodulator module for converting voice messages received from a base station into standard speech parameter frames, each standard speech parameter frame having an LPC frame and four subframes;
    a decimator for decimating the standard speech parameter frames into decimated frames, each decimated frame having the respective LPC frame and one subframe; wherein the decimated frame has 40 parameters;
    an audio frame storage area for storing the decimated frames of the voice messages; and
    an interpolator for converting the decimated frames, stored in the audio frame storage area, into the standard speech parameter frames.

4. The radiotelephone of claim 1 wherein the interpolator interpolates the subframes of the standard speech parameter frame by repeating data in the subframe of the decimated frame.

5. A parameter-based speech compression and decompression method, comprising the steps of:
receiving a voice message encoded into standard speech parameter frames, each parameter frame having an LPC frame and a plurality of subframes;
decimating each standard speech parameter frame into a decimated frame having the LPC frame and one subframe;
storing the decimated frames; and
interpolating the standard speech parameter frames from the stored decimated frames.

6. The method of claim 5, wherein each standard speech parameter frame has four subframes.

7. A parameter-based speech compression and decompression method, comprising the steps of:
receiving a voice message encoded into standard speech parameter frames, each parameter frame having an LPC frame and a plurality of subframes;
decimating each standard speech parameter frame into a decimated frame having the LPC frame and one subframe, wherein the decimated frame has 40 parameters;
storing the decimated frames; and
interpolating the standard speech parameter frames from the stored decimated frames.

8. The method of claim 5, further comprising the step of interpolating the subframes of the standard speech parameter frames by repeating data in the subframe of the decimated frames.

9. The parameter-based speech compression and decompression method according to claim 5, wherein said method is used in a voice communication device selected from the group consisting of cellular radiotelephones and pagers, and said voice communication device comprises a DTAM/Voice Memo having a Digital Telephone Answering Machine (DTAM), used for saving voice messages sent to the cellular radiotelephone from afar, and a Voice Memo, used for saving voice messages received from the cellular radiotelephone microphone.

10. A radiotelephone having a "SAVE" and a "PLAY" mode, comprising:
a receiver/demodulator for converting voice messages from a base station into standard speech parameters frames, each standard speech parameter frame having an LPC frame and a plurality of subframes;
a microphone for receiving voice messages from a user;
an audio sample module for converting the voice messages from the microphone into local speech samples;
an encoder for encoding the local speech samples into the standard speech parameter frames,
a control button having a "SAVE" and a "PLAY" mode position;
a decimator for converting the standard speech parameter frames into decimated frames during the "SAVE" mode, each decimated frame having the LPC frame and one subframe;
an audio frame storage area for storing the decimated frames;
an interpolator for converting decimated frames retrieved from the audio frame storage area into the standard speech parameter frames during the "PLAY" mode;
a speech decoder for decoding the standard speech parameter frames into linear speech samples;
a speaker for playing the voice messages to the user; and
a playback buffer for collecting the linear speech samples in burst mode and sending the liner speech samples to the speaker.

11. The radiotelephone of claim 10 wherein the interpolator and decimator comprise computer programs stored in a code storage area.

12. The radiotelephone of claim 10 wherein each standard speech parameter frame has the LPC frame and four subframes.

13. The radiotelephone of claim 10 wherein the interpolator interpolates the subframes of the standard speech parameter frame by repeating data in the subframe of the decimated frame.

14. The radiotelephone of claim 10 wherein the interpolator interpolates the subframes of the standard speech parameter frame by padding unstored subframes with zeros.

15. The radiotelephone of claim 10 wherein
the decimated frame has the LPC frame and two subframes
and the interpolator interpolates the subframes of the standard speech parameter frame by repeating data in the subframes of the decimated frame.

* * * * *